United States Patent
Levesque et al.

(10) Patent No.: US 7,457,858 B1
(45) Date of Patent: Nov. 25, 2008

(54) FILTERING NETWORK MANAGEMENT MESSAGES

(75) Inventors: Gilbert Levesque, Mountain View, CA (US); Dharmendra J. Naik, San Jose, CA (US); Mandar A. Shinde, Milpitas, CA (US); Avaneesh C. Arora, San Jose, CA (US); Syed F. Haq, San Jose, CA (US)

(73) Assignee: Fujitsu Limited, Kawasaki (JP)

( * ) Notice: Subject to any disclaimer, the term of this patent is extended or adjusted under 35 U.S.C. 154(b) by 1637 days.

(21) Appl. No.: 09/824,997

(22) Filed: Apr. 2, 2001

(51) Int. Cl.
*G06F 15/173* (2006.01)
*G06F 15/16* (2006.01)

(52) U.S. Cl. .................. 709/223; 709/206; 709/232

(58) Field of Classification Search .......... 709/223, 709/207, 217, 219, 224, 225, 226, 229, 232, 709/245, 238
See application file for complete search history.

(56) References Cited

U.S. PATENT DOCUMENTS

| | | | | |
|---|---|---|---|---|
| 5,528,503 A * | 6/1996 | Moore et al. | ............... | 700/95 |
| 5,764,955 A * | 6/1998 | Doolan | ................ | 709/223 |
| 5,884,033 A * | 3/1999 | Duvall et al. | ............... | 709/206 |
| 5,892,916 A * | 4/1999 | Gehlhaar et al. | ........... | 709/223 |
| 5,983,270 A * | 11/1999 | Abraham et al. | ........... | 709/224 |
| 5,991,814 A * | 11/1999 | Rzonca et al. | ............. | 709/237 |
| 6,047,279 A * | 4/2000 | Barrack et al. | ............... | 706/60 |
| 6,072,942 A * | 6/2000 | Stockwell et al. | .......... | 709/206 |
| 6,092,101 A * | 7/2000 | Birrell et al. | ............... | 709/206 |
| 6,249,803 B1 * | 6/2001 | Jindal et al. | ................ | 709/203 |
| 6,311,278 B1 * | 10/2001 | Raanan et al. | ............. | 713/201 |
| 6,449,643 B1 * | 9/2002 | Hyndman et al. | .......... | 709/223 |
| 6,470,394 B1 * | 10/2002 | Bamforth et al. | ........... | 709/241 |
| 6,487,590 B1 * | 11/2002 | Foley et al. | ................ | 709/223 |
| 6,519,635 B1 * | 2/2003 | Champlin et al. | .......... | 709/223 |
| 6,553,341 B1 * | 4/2003 | Mullaly et al. | ................ | 704/9 |
| 6,571,275 B1 * | 5/2003 | Dong et al. | ................. | 709/209 |
| 6,731,627 B1 * | 5/2004 | Gupta et al. | ............... | 370/352 |
| 6,801,929 B1 * | 10/2004 | Donoho et al. | ............. | 709/204 |
| 6,842,775 B1 * | 1/2005 | Chastain et al. | ............ | 709/207 |
| 6,847,989 B1 * | 1/2005 | Chastain et al. | ............ | 709/207 |

* cited by examiner

*Primary Examiner*—Ario Etienne
*Assistant Examiner*—El Hadji M Sall
(74) *Attorney, Agent, or Firm*—Baker Botts L.L.P.

(57) ABSTRACT

A network management system includes a network management server and one or more clients initiating network management messages between the server and network elements. The server parses the network management messages and communicates each message to client consoles having filtering criteria satisfied by the contents of the message.

15 Claims, 6 Drawing Sheets

FILTERING NETWORK MANAGEMENT MESSAGES

TECHNICAL FIELD OF THE INVENTION

The present invention relates generally to network management systems and, more particularly, to filtering of network management messages.

BACKGROUND OF THE INVENTION

In communication systems, network management systems configure and monitor various network elements using management messages in various protocols such as transaction language 1 (TL1) or simple network management protocol (SNMP). For example, using management messages, a network management system can set up and monitor network elements, such as line cards in a SONET network element. With the dramatic increases in the number of network elements requiring management, network management systems must frequently handle vast quantities of information relating to managed network elements.

SUMMARY OF THE INVENTION

In accordance with the present invention, techniques for filtering of network management messages are provided which substantially eliminate or reduce disadvantages and problems associated with previous techniques. In a particular embodiment, the present invention satisfies a need for a network management system that receives network management messages, parses these messages into their constituent fields, and, for each message, compares the values of the fields to filtering criteria established for any number of client consoles and communicates the fields of the message to those client consoles for which the values of the fields satisfy the filtering criteria.

In accordance with a particular embodiment of the present invention, a method for processing a network management message receives the network management message and parses the network management message into fields. The method then accesses filtering criteria for a number of client consoles. For each of the client consoles, if the fields satisfy the filtering criteria, the method communicates the fields to the client console for display by the client console.

Various embodiments of the present invention provide a number of technical advantages. However, embodiments may display some, all, or none of the various advantages detailed below. Using these techniques, a network management system effectively and efficiently presents real-time network management information to any number of display consoles based on filtering criteria established for each console. For a console, the filtering criteria may include a user type or access level for the console and specific values or types of values to compare against one or more of the fields of received messages. For example, the filtering criteria for a console may specify particular message types to display. However, by also permitting filtering based on user types, the network management system can implement security to limit access to network management information to only appropriate users. In addition, by allowing users to specify filtering criteria, the network management system presents only relevant information, as determined by a user, selected from real-time network management messages.

According to particular embodiments, consoles that display filtered network management messages to users permit user-defined ordering of displayed fields from the messages. Because each console receives network management messages in parsed form, a user may select to rearrange the order in which these fields are presented in the display. For example, a user may select to order the fields of received messages such that the message type field is displayed in the first column for all displayed messages. Therefore, as a console receives real-time network management messages for display, the console may rearrange the order of the received fields before displaying each network management message.

Other technical advantages of the present invention will be readily apparent to one skilled in the art from the following figures, descriptions, and claims.

BRIEF DESCRIPTION OF THE DRAWINGS

For a more complete understanding of the present invention and its advantages, reference is now made to the following description, taken in conjunction with the accompanying drawings, in which.

DETAILED DESCRIPTION OF THE INVENTION

Figure 1:
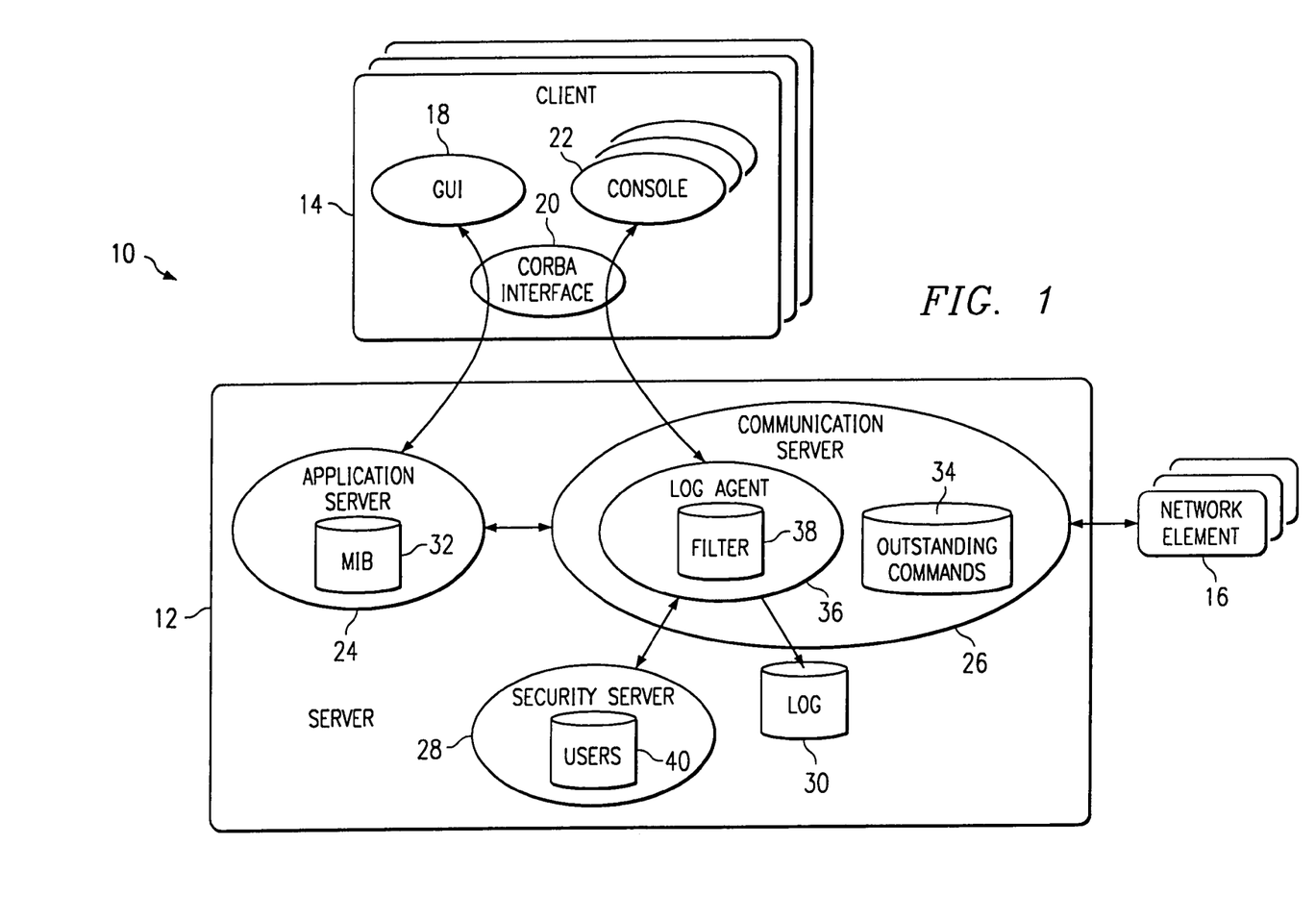
FIG. 1 illustrates a communication system having a network management server for parsing and filtering network management messages for communication of each message to selected consoles for display.

FIG. 1 illustrates a communication system, indicated generally at 10, that includes a network management server 12, network management clients 14, and network elements 16. In general, clients 14 issue network management commands to server 12 for communication to network elements 16, and clients 14 display network management messages received from server 12. Server 12 translates and formats commands from clients 14, communicates these commands to network elements 16, receives various messages from network elements 16, and communicates these messages in various forms to selected clients 14. More specifically, server 12 includes elements for filtering network management messages and communicating each message to display elements on appropriate clients 14 based on filtering criteria.

Server 12 represents hardware, including any appropriate software and/or logic, providing an interface between clients 14 and network elements 16. Similarly, clients 14 represent hardware, including appropriate software and/or logic, for interfacing with users to support network management of network elements 16. These network elements 16 represent local and remote network equipment, including software and/or logic, capable of receiving and responding to network management messages and generating autonomous network management messages. For example, network elements 16 may include communications cards and/or components of cards installed in communication equipment racks. Thus, server 12 provides an interface for clients 14 to issue commands to network elements 16 and receive responses, acknowledgements, and other types of messages from network elements 16. Network management messages include any communications with network elements 16 for creating, updating, configuring, obtaining status, monitoring operation, or performing other suitable functions. Moreover, server 12 and network elements 16 may communicate network management messages using control channels, communication channels, and/or other suitable connections.

To facilitate interactions with users and with server 12, client 14 includes a graphical user interface (GUI) 18, a common object request broker architecture (CORBA) interface 20, and one or more consoles 22. Using GUI 18, client 14 graphically presents on a display information on various network elements 16 managed by client 14. For example, GUT 18 may graphically depict a communications equipment rack and cards mounted within the rack, along with other information, such as status and configuration information and available operations for the displayed equipment. GUI 18 also allows users to specify commands for communication to network elements 16. For example, using "point and click" techniques, a user may specify a cross-connect command between network elements 16 graphically depicted by GUI 18. GUI 18 communicates these commands using CORBA interface 20 to server 12. GUI 18 also receives responses, acknowledgements, and updates from server 12 through CORBA interface 20 and updates its graphical depictions based upon the information received.

Client 14 also includes one or more consoles 22, which display real-time and/or other suitable network management messages in with information from the native communication protocol used by server 12 to communicate with network elements 16. That is, while client 14 may communicate with server 12 using any appropriate protocol, such as CORBA, server 12 may communicate with network elements 16 using a disparate protocol, such as transaction language 1 (TL1) network management protocol. Thus, console 22 displays information in the form used for the native communications between server 12 and network elements 16. For example, console 22 may display all of the fields or selected fields of TL1 messages reported from server 12. Client 14 may display console 22 as discrete windows of a shared display and/or using separate displays.

Therefore, consoles 22 provide displays for presenting network management messages received from server 12. Because server 12 reports these messages to consoles 22 on a real-time basis, consoles 22, according to a particular embodiment, each provide a buffer for storing previously received messages. For example, console 22 may provide a scroll bar for scrolling among the previously received one thousand network management messages. However, the size of the buffer and the number of stored previously received network management messages may be set according to any appropriate system requirements/configurations.

Figure 2:
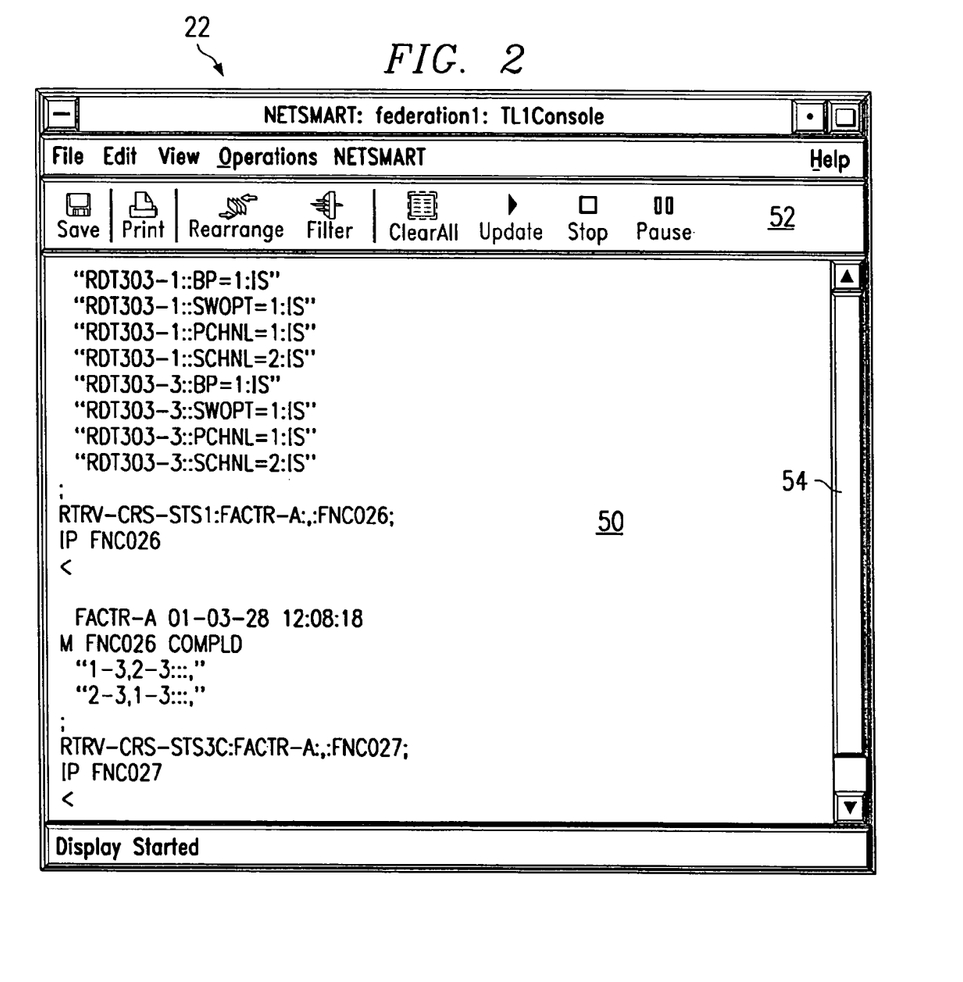
FIG. 2 illustrates a console for displaying parsed, filtered messages received from the server.
Figure 3:
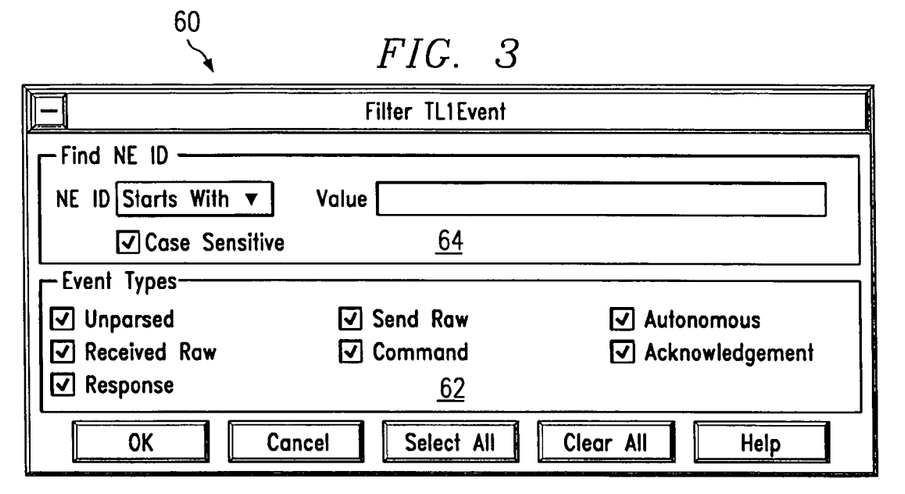
FIG. 3 illustrates a filtering criteria selection dialog window that permits a user to specify filtering criteria to be applied by the network management server.
Figure 4:
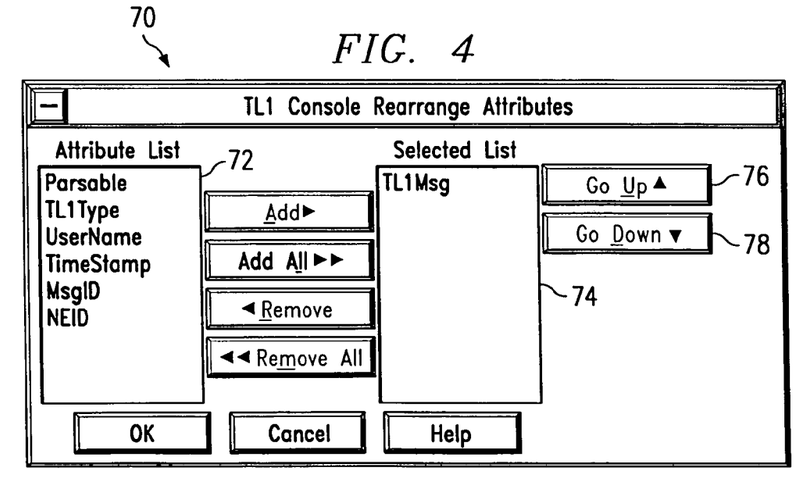
FIG. 4 illustrates a rearrangement dialog window that permits a user to order the display of fields on the console for each received message.

Each console 22 receives network management messages for display from server 12 based on filtering criteria established for the particular console 22, with the filtering criteria potentially including a user type for console 22 and filter options selected by a user of console 22. Thus each console 22 has associated filtering criteria that may be unique or identical to other consoles 22. For example, a user may establish one console 22 for receiving all messages of a particular message type. The user may also establish other consoles 22 for receiving network management messages based upon the same or different filtering criteria. Thus, a user of client 14 may establish one or more consoles 22 for displaying network management messages according to any selected filtering criteria. In setting up or using consoles 22, users specify particular filtering options, which consoles 22 then communicate using CORBA interface 20 to server 12. Server 12 uses the filtering options, along with a user type associated with console 22, to determine filtering criteria for the associated console 22. Server 12 then uses the established filtering criteria for all consoles 22 to route each network management message for display on appropriate consoles 22. The description below with respect to FIGS. 2-4 provides greater detail of a particular embodiment for consoles 22.

To provide a readily defined interface between elements of client 14 and server 12, client 14 uses CORBA interface 20 to facilitate communication. For communications to server 12, CORBA interface 20 receives information from GUI 18 and/or consoles 22, formats each particular communication from GUI 18 or console 22 into a CORBA message, and communicates the CORBA message to the appropriate element of server 12. In addition, CORBA interface 20 receives CORBA messages from elements of server 12 and communicates information from these messages in an appropriate form to GUI 18 and consoles 22. The use of a defined standard, such as CORBA, for communications between clients 14 and server 12, permits effective, efficient implementation of client 14. Moreover, the use of CORBA messages abstracts the specific underlying communication protocols used for network management messages between server 12 and network elements 16. For example, server 12 may communicate with network elements 16 using a TL1 protocol. Yet, by providing a generic CORBA interface, client 14 allows for integration with systems using any appropriate network management protocols. However, while the embodiment illustrated and the accompanying description focuses on the use of CORBA messages for communications between client 14 and server 12, system 10 contemplates client 14 and server 12 communicating using any number and suitable type of communications protocols.

According to particular embodiments, server 12 communicates with network elements 16 using the TL1 management protocol. The TL1 protocol implements messaging using human readable, American Standard Code for Information Interchange (ASCII) text messages to send commands and receive responses, acknowledgements and autonomous messages. For this embodiment and other embodiments using human readable messaging between server 12 and network elements 16, consoles 22 display the actual messages communicated between server 12 and network elements 16 in a parsed and filtered format. Thus, consoles 22 display the content of network management messages satisfying established filtering criteria. Therefore, while GUI 18 provides a user-friendly interface that abstracts network management functions from the underlying network management protocol in use, consoles 22 display information from the actual network management messages communicated between server 12 and network elements 16. Moreover, for each different management protocol used for communications between server 12 and network elements 16, clients 14 may have one or more consoles 22 corresponding to each protocol.

To interface between clients 14 and network elements 16, server 12 includes an application server 24 and a communication server 26. Server 12 also includes a security server 28 that provides information for limiting access of various clients 14 to network messages, and server 12 includes a network management messages log 30 that stores all network management messages transmitted and received by server 12. Working together, these elements permit server 12 to act as an interface between clients 14 and network elements 16 and to provide logging and reporting of communications with network elements 16.

Application server 24 communicates through CORBA interface 20 with GUI 18 to receive commands generated by users and to update the information displayed by GUI 18. In general, application server 24 acts as a gatekeeper, allowing only valid commands from clients 14, while also ensuring that GUI's 18 on clients 14 remain appropriately updated with respect to the condition of network elements 16. To aid in validation of commands received from GUI's 18, application server 24 includes a management information base (MIB) 32 that maintains state information detailing the current status and configuration of network elements 16. Using this information, application server 24 determines the validity of commands received from clients 14. For example, given a current configuration for network element 16, application server 24 may determine whether a command received from GUI 18 requests an appropriate operation. Application server 24 passes valid commands on to communication server 26 and, for invalid commands, application server 24 denies the request from client 14. According to particular embodiments, application server 24 communicates with communication server 26 using CORBA messages. Thus, for valid commands, application server 24 passes on the CORBA message received from GUI 18 without alterations. However, system 10 contemplates application server 24 and communication server 26 communicating using any suitable protocols, and application server 24 performing any appropriate modifications or translations before forwarding commands from GUI's 18.

Application server 24 also uses the information maintained in MIB 32 to process responses, acknowledgements, and autonomous messages received from communication server 26. For example, upon receiving a response to a command issued by client 14, application server 24 accesses and updates MIB 32 based on the response and determines clients 14 affected by the message from communication server 26. For example, upon receiving a response from communication server 26, application server 24 accesses MIB 32 to determine client 14 that issued the command leading to the response. Application server 24 then communicates the response and/or other appropriate information from MIB 32 to that client 14. In addition, application server 24 may also access MIB 32 to determine other clients 14 affected by the response. For example, multiple clients 14 may manage or monitor a particular network element 16. Thus, information from one network element 16 may require updates from application server 24 to multiple clients 14 actively viewing or using information for element 16. Therefore, application server 24 acts as a gatekeeper to ensure validity of requests received from clients 14 and as a conduit to ensure that messages received through communication server 26 from network elements 16 pass to the appropriate clients 14.

Within server 12, communication server 26 provides an interface between application server 24 and network elements 16. Thus, for the embodiment illustrated, communication server 26 translates between CORBA messages communicated with application server 24 and the underlying network management protocol, such as TL1, used for communications with network elements 16. For example, upon receiving a CORBA message from application server 24 that includes a request from a particular client 14 to issue a command to network element 16, communication server 26 translates the CORBA message into the appropriate TL1 format and communicates the TL1 command to network element 16. To perform this translation, communication server 26 determines the fields for the TL1 command based on information in the received CORBA message. Additionally, communication server 26 may generate other fields, such as a message identifier, required by the TL1 protocol but not included in the CORBA message. Communication server 26 then formats the fields determined from the CORBA message along with the additional generated fields into a TL1 command. For example, communication server 26 may appropriately order the fields and generate an ASCII text string with the fields delimited by commas. Communication server 26 communicates this TL1 command to the appropriate network element 16. However, because communication server 26 can support other or multiple protocols, communication server 26 may include various translators for each protocol used for communications with clients 14 and/or network elements 16.

According to particular embodiments, the TL1 command communicated to network element 16 does not uniquely identify client 14 that initiated the command. Similarly, the response and/or acknowledgements received in response to the command will not identify client 14. However, the TL1 command may include a message identifier, such as a "CTAG" (correlation tag) field that, in conjunction with the session established with network element 16, uniquely identifies the command. Thus, to permit the association of received responses with responsible clients 14, communication server 26 maintains outstanding command information 34. Outstanding command information 34 stores information on commands issued to network elements 16 yet still awaiting responses. This information includes data for relating each received response from a particular network element 16 to client 14 that issued the command instigating the response. Thus, to permit association of received responses to the issued TL1 command with appropriate clients 14, communication server 26 generates an entry in outstanding command information 34 associating the identity of client 14 with the CTAG and session for the command. In addition, because communication server 26 can support other or multiple protocols, communication server 26 may include multiple parsers for handling various protocols.

Communication server 26 also handles the receipt of messages from network elements 16. The messages received from network elements 16 may include, for example, acknowledgement of received commands, responses to commands, unsolicited/autonomous messages, and other appropriate types of messages. Upon receiving a network management message from a selected network element 16, communication server 26 parses the message into its constituent fields. For example, a TL1 message may include a comma delimited string of fields, which communication server 26 parses out into separate fields. By examining a message identifier field, communication server 26 determines whether the received message is associated with a command that was previously sent. For example, within a TL1 message, a CTAG identifier will match up to the CTAG identifier for a command issued from communication server 26. If, however, the TL1 message identifier includes an ATAG, it signifies that the message is an autonomous message.

For autonomous messages, communication server 26 formats the parsed fields from the received message into a CORBA message and forwards the CORBA message to application server 24. However, for messages responsive to previous commands, communication server 26 first accesses outstanding command information 34 to identify client 14 associated with the message. Then, using the identity of client 14 and the fields from the received message, communication server 26 translates the response into a CORBA message and communicates the CORBA message to application server 24 for forwarding to appropriate clients 14.

In addition to translating between the protocols used to communicate with application server 24 and network elements 16, communication server 26 also provides reporting and logging of the information from some or all network management messages. Thus, communication server 26 supports logging and reporting of network management messages transmitted to and received from network elements 16. Moreover, communication server 26 supports logging of this information in the native protocol used for communications with network elements 16. When using a human readable protocol, such as TL1, this provides for the logging and reporting of the actual values from the fields of network management messages.

To provide the logging and reporting functionalities, communication server 26 includes log agent 36. In general, log agent 36 provides logging of network management messages communicated by communication server 26 with network elements 16, as well as reporting of these messages to particular consoles 22 based on filtering criteria established for each console 22. To support the logging and reporting of log agent 36, communication server 26 passes a copy of each network management message communicated with network elements 16 to log agent 36 in a parsed form. Log agent 36 stores each of these messages into log 30. For example, upon receiving a parsed message from communication server 26, log agent 36 generates an entry in log 30 with each separate field of the message maintained in a separate column of the entry. Thus, by operating on parsed messages, log agent 36 may quickly and effectively store each message into log 30. This permits real-time storage of messages in a format that may be easily accessed and manipulated as necessary. Moreover, because communication server 26 passes all network management messages, both transmitted and received, to log agent 36, log 30 includes a record of all network management messages communicated with network elements 16 by server 12.

In addition to logging all messages in log 30, log agent 36 also reports messages to consoles 22 based on filtering criteria established for each console 22. To enable this filtering process, log agent 36 includes filtering information 38, which maintains filtering criteria for each console 22. For example, filtering information 38 may store a filter table that includes entries for each console 22 indicating a console identifier in various filtering criteria for determining whether to communicate messages to this particular console 22. These filtering criteria include parameters established by console 22 to filter out only desired messages to receive. Thus filtering criteria may include specific values for particular fields in messages to be delivered to console 22 by log agent 36. For example, a particular console 22 may select to receive only messages from a selected network element 16. In addition to filtering criteria established by consoles 22, filtering information 38 for each console 22 also includes user information for limiting the distribution of messages to appropriate consoles 22. This user information implements security to prevent unauthorized users from establishing consoles 22 to receive messages from unauthorized network elements 16. For example, a general user may have access only to messages responsive to commands issued by that user. Similarly, a super-user may have access to all messages communicated with network elements 16.

To establish user access levels in filtering information 38, log agent 36 communicates with security server 28. For example, when setting up filtering information 38 for a new console 22, log agent 36 may determine a user identifier associated with client 14 or the user of client 14, and, using this identifier, requests an access from security server 28. Security server 28 accesses user information 40 to determine the user type and/or access level for the identified user and returns this information to log agent 36. For example, system 10 may include various user levels corresponding to different levels of access to network management messages, such as a super-user having access to all messages and other levels of users, each having various restrictions on access to network management messages. Therefore, using the access level information from security server 28 in conjunction with various filtering options received from console 22, log agent 36 establishes filtering information 38 for use in selecting particular messages to communicate to console 22. Thus, for each message received in parsed form from communication server 26, log agent 36 stores the message in log 30 and communicates the parsed message to any number of consoles 22 upon identifying matches in filtering information 38.

While the embodiments illustrated for server 12 and clients 14 include specific logical elements coupled and communicating in a particular fashion, system 10 contemplates server 12 and clients 14 implementing their various functions using any suitable combination and arrangement of hardware, software, and other appropriate logic. Thus, while these embodiments illustrate a particular distribution of functionalities among various logical elements, system 10 contemplates any suitable distribution, separation or combination of functionalities, so long as the elements provide for the parsing of network management messages and the filtering of these parsed messages for communication to one or more client consoles. Moreover, while the embodiment illustrates server 12 separate from clients 14, system 10 contemplates any suitable combination or separation of server 12 and clients 14 on one or more computing devices. Thus, for example, server 12 and clients 14 may represent separate processes executing on a single computing device or on different computing devices.

FIG. 2 is a screen shot illustrating an exemplary console 22 displayed by client 14. As demonstrated by this exemplary embodiment, console 22 may use a graphical "window" interface to display network management messages received from log agent 36 and to provide various options to users. In the embodiment illustrated, console 22 includes a display frame 50 and a tool bar 52. Within display frame 50, console 20 displays, in chronological order, messages received from log agent 36. Thus, display frame 50 provides a real-time log of messages filtered according to the particular filtering criteria established for this console 22. As previously discussed, console 22 may include a buffer that stores, for example, the one thousand most recently received messages from log agent 36. To access this buffer, console 22 provides a scroll bar 54 that allows a user to scroll to buffered messages. Moreover, using console 22, a user may recall and view previously received messages, such as messages stored in log 30, and view these messages based on established filtering options.

Tool bar 52 allows users of console 22 to access various management and configuration functions of console 22. In the embodiment illustrated, tool bar 52 provides traditional functions of "save" and "print." As with typical applications, these functions in tool bar 52 provide for saving the buffer of console 22 into a file and printing of the buffer of console 22. Toolbar 52 also provides access to various flow control options for network management messages received from server 12. To stop and subsequently resume receiving messages from log agent 36, tool bar 52 includes "stop" and "update" buttons. When receiving messages from log agent 36, selecting the stop button, causes console 22 to discontinue displaying received messages and to discard any new messages received from log agent 36. Thus, console 22 does not buffer any messages from log agent 36 received after selecting the stop button. To resume storing of received messages from log agent 36 in the buffer and the display of these messages in display frame 50, a user may select the update button. To temporarily pause the display of received messages in display frame 50 while maintaining received messages in the buffer, tool bar 52 includes a "pause" button. By selecting the pause option, a user halts the display of new messages received from log agent 36. However, while paused, console 22 continues storing newly received messages in the buffer. Thus, upon selecting the update button, console 22 will display the messages received from log agent 36 while in the pause state. To clear the contents of the buffer maintained by console 22 and the messages in display frame 50, tool bar 52 includes a "clear all" button.

To configure the types of messages to receive from log agent 36 and the particular order in which those messages are displayed in display frame 50, tool bar 52 includes a "rearrange" button and a "filter" button. Upon selecting the rearrange button, console 22 launches a separate window that provides a user various options for arranging the order of fields in messages displayed in display frame 50. On selecting the filter button, console 22 launches a separate window that permits a user to specify criteria for use by log agent 36 in selecting messages to communicate to console 22. The separate windows are discussed below in more detail with respect to FIGS. 3 and 4. However, while the embodiment illustrated for console 22 includes specific buttons and frames arranged in a particular manner, system 10 contemplates console 22 having any appropriate frames, buttons, and functionalities for displaying network management messages received from log agent 36.

FIG. 3 illustrates an exemplary filtering options dialog window 60 used by console 22 to receive filtering options from a user. In the embodiment illustrated, the dialog window permits a user to select to receive particular message types and to filter for messages from particular network elements 16. For example, by selecting from the message types in a message type selection window 62, a user may determine the type of messages filtered by log agent 36 for communication to console 22. Similarly, using the options in a network element selection window 64, a user may specify values to match against identifiers associated with network elements 16 such that log agent 36 forwards only messages associated with particular network elements 16.

However, while the embodiment illustrated contains specific options arranged in a particular format, system 10 contemplates console 22 presenting any suitable interface for a user to identify filtering criteria for use by log agent 36. Moreover, while the embodiment illustrated provides only limited options for filtering messages, system 10 contemplates console 22 permitting users to specify any suitable filtering options and values for comparing against information in network management messages processed by communication server 26. Thus, users may specify any number of values and fields for filtering message, with the types of values and fields depending upon the format and protocol for network management messages processed by communication server 26.

FIG. 4 illustrates a rearrangement dialog window 70 for use by a user in arranging the order of presentation of fields for each network management message displayed in display frame 50. Within an attribute list frame 72, window 70 displays the fields available to display for each message received from log agent 36. Within a selected attributes frame 74, window 70 displays those fields from received messages that will be displayed by display frame 50. By moving attributes between these frames 72 and 74, a user may specify those fields from each message to display. Thus, a user may select to view some or all of the fields for messages received from log agent 36.

In addition, a user may arrange the order in which fields of received messages are displayed in display frame 50. The order of fields in selected attributes frame 74, from top to bottom, corresponds to the order in which fields from received messages are displayed, from left to right, in display frame 50. Thus, to change the order in which fields are displayed, a user selects one of the fields in selected attributes frame 74 and, using an up button 76 or a down button 78, rearranges the ordering of the selected fields. Thus, using window 70, a user of console 22 defines the fields viewed for each message received from log agent 36 as well as the ordering of those fields in display frame 50. However, as with the previous exemplary embodiments, system 10 contemplates console 22 providing any suitable options and interfaces for selecting options for the display and arrangement of various fields of network management messages received from log agent 36.

Figure 5:
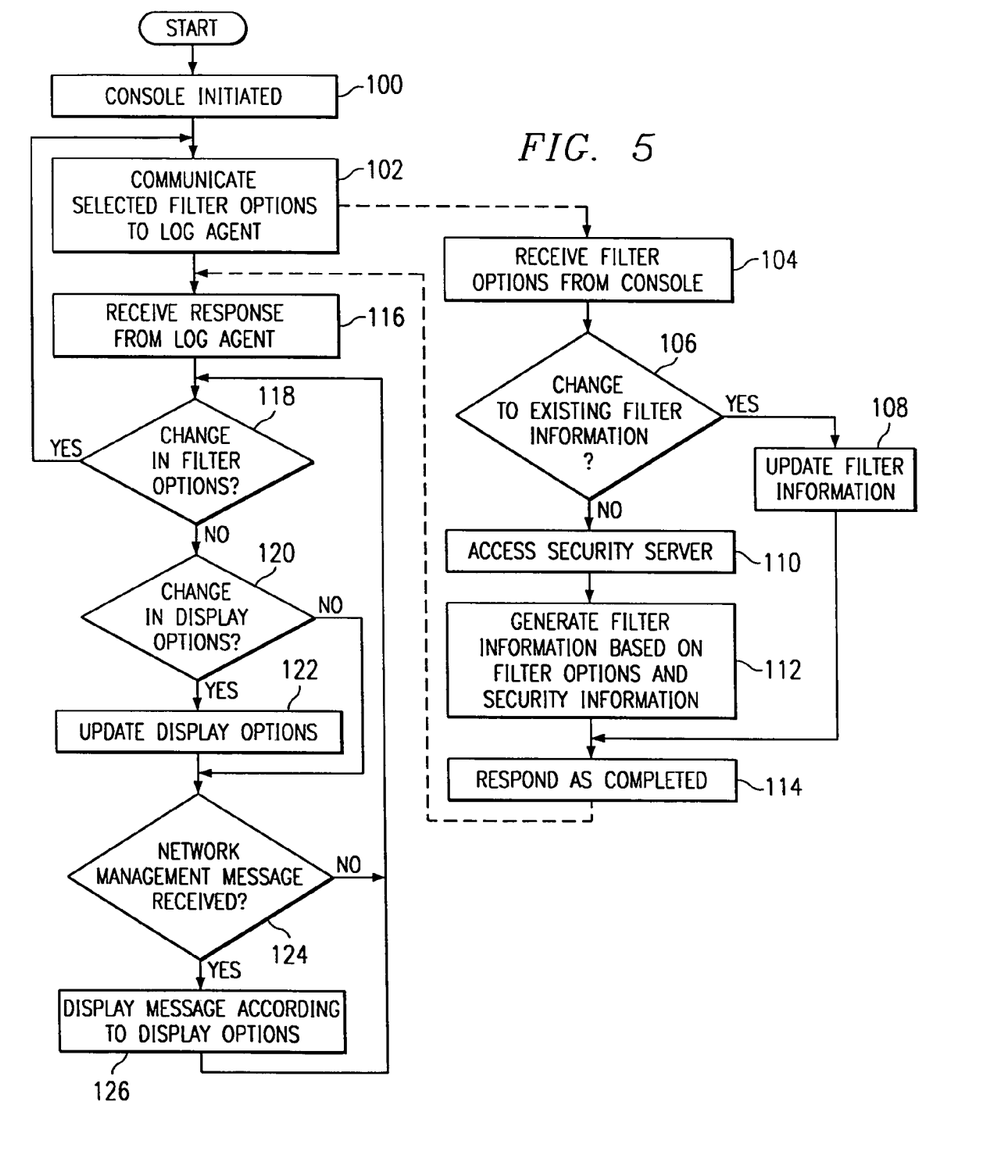
FIG. 5 is a flowchart illustrating a method for establishing and updating filtering criteria for consoles.

FIG. 5 is a flowchart illustrating the interaction between console 22 and log agent 36 for setting up and modifying filter information 38 in addition to the operation of console 22 in displaying received network management messages. Console 22 is initiated at step 100 and communicates selected filter options to log agent 36 at step 102. For example, at initiation, console 22 may communicate a set of default filter options or may access profiles or other information to determine selected filter options for a particular user.

Log agent 36 receives the filter options from console 22 at step 104 and determines whether the received filter options represent a change to existing filter information 38 at step 106. For example, based upon a console identifier communicated by console 22 along with the request for selected filter options, log agent 36 may access filter information 38 to determine whether an entry for this console 22 has previously been established. If so, log agent 36 updates filter information 38 at step 108, and responds to console 22 as completed at step 114. However, if log agent 36 determines that the selected filter options communicated from console 22 are not yet entered into filter information 38, log agent 36 accesses security server 28 to determine access information for console 22. As previously discussed, log agent 36 may receive any suitable information received from security server 28 to determine an appropriate user type or access level for including in filter information 38. Thus, upon receiving user access information from security server 28, log agent 36 generates an entry in filter information 38 for console 22. This entry is based on filter options received from console 22 and security information received from security server 28. Upon generating the entry in filter information 38, log agent 36 responds as completed at step 114. Thus, steps 104 through 114 detail the exemplary operation of log agent 36 in response to requests from consoles 22 to create or update filter information 38.

During operation, console 22 provides users an option to alter filter options. Thus, in this flowchart, console 22 determines whether a user has changed filter options at step 118. If so, console 22 once again communicates the selected filter options to log agent 36 at step 102. However, given no change in the filter options, console 22 determines whether a user has changed display options at step 120. The display options represent the fields selected for display and the ordering of these fields as selected by a user through window 70. Given a change in the display options, console 22 updates the display options such that subsequently received messages are displayed according to the selected options. Given no change in the display options, console 22 skips step 122. At step 124, console 22 determines whether a network management message has been received from log agent 36. If so, console 22 displays the message according to the selected display options at step 126. Otherwise, console 22 continues monitoring for changes in filtering options, display options, or for received messages. Thus, at steps 118 through 126, console 22 provides for the receipt and display of network management messages from log agent 36 and for user initiated changes in filter options and display options.

Figure 6:
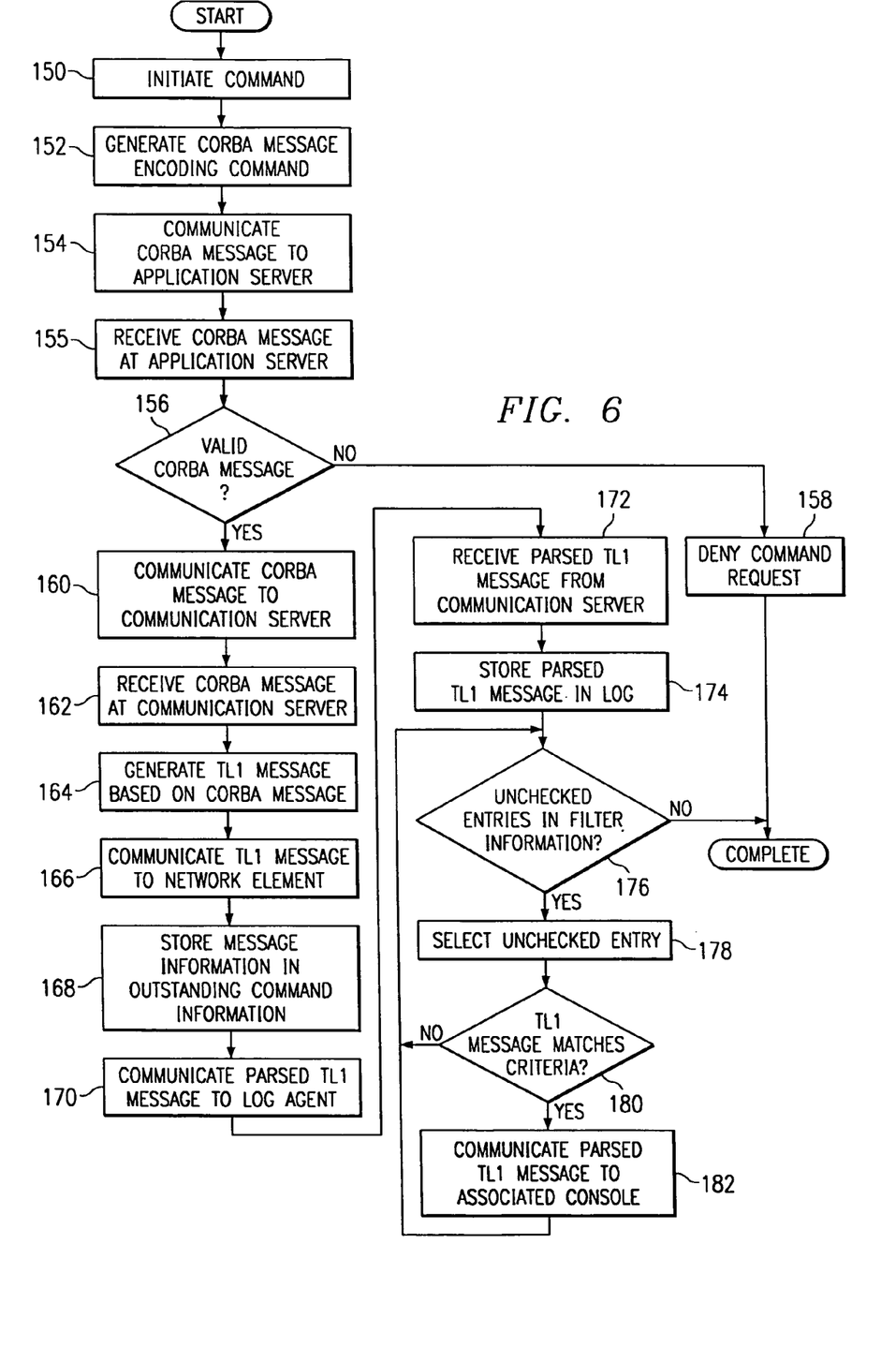
FIG. 6 is a flowchart illustrating a method for processing and communicating a network management message to a network element and parsing and filtering the message for display on selected consoles.

FIG. 6 is a flowchart illustrating a method for processing commands generated by GUI 18 that are communicated through various elements of client 14 and server 12 to network element 16. Using GUI 18, a user initiates a command, such as a cross-connect command, at step 150. Based upon the command initiated, CORBA interface 20 generates a CORBA message encoding the command at step 152 and communicates the CORBA message to application server 24 at step 154.

Application server 24 receives the CORBA message from client 14 at step 155 and determines whether this is a valid CORBA message at step 156. For example, application server 24 may access MIB 32 to determine state information for network element 16 specified in the CORBA message. Based upon the command, the state of network element 16, the identity of client 14, and any other suitable information, application server 24 determines the validity of the message. If the message is invalid, application server 24 denies the request at step 158 and completes processing for this command. However, upon determining that the message is valid, application server 24 communicates the CORBA message to communication server 26 at step 160.

Communication server 26 receives the CORBA message from application server 24 at step 162. Communication server 26 translates the CORBA message to generate a TL1 message at step 164 and communicates the TL1 message to the appropriate network element 16 at step 166. In addition, communication server 26 stores message information for this TL1 message in outstanding command information 34 at step 168. As previously discussed, this information permits communication server 26 to associate future responses to this TL1 message with the particular client 14 that initiated the message. In addition to communicating the TL1 message to the appropriate network element 16 and generating an entry in outstanding command information 34, communication server 26 also communicates the parsed fields of the TL1 message to log agent 36 at step 170. As previously discussed, because communication server 26 generates the TL1 message based on information contained in the CORBA message, communication server 26 has the fields of the TL1 message in parsed form for communication to log agent 36.

Log agent 36 receives the parsed TL1 message from communication server 26 at step 172, and stores the parsed TL1 message in log 30 at step 174. Log agent 36 also matches the parsed fields of the message against filter information 38 to determine appropriate consoles 22 to receive the message. To perform this matching, log agent 36 determines whether unchecked entries in filter information 38 remain at step 176. This determines whether all entries for consoles 22 in filter information 38 have been compared against the message. If no unchecked entries remain, processing for this message is complete. However, if unchecked entries remain, log agent 36 selects an unchecked entry from filter information 38 at step 178 and determines whether the parsed TL1 message satisfies the criteria established for that entry at step 180. If not, log agent 36 continues checking the remaining entries in filter information 38. However, upon determining that the fields of the TL1 message satisfy the criteria for an entry, log agent 36 communicates the parsed TL1 message to the associated console 22 at step 182. Therefore, at steps 176-182, log agent 36 determines selected consoles 22 with filtering criteria matching the fields of the TL1 message and communicate the parsed TL1 message to those consoles 22.

Figure 7:
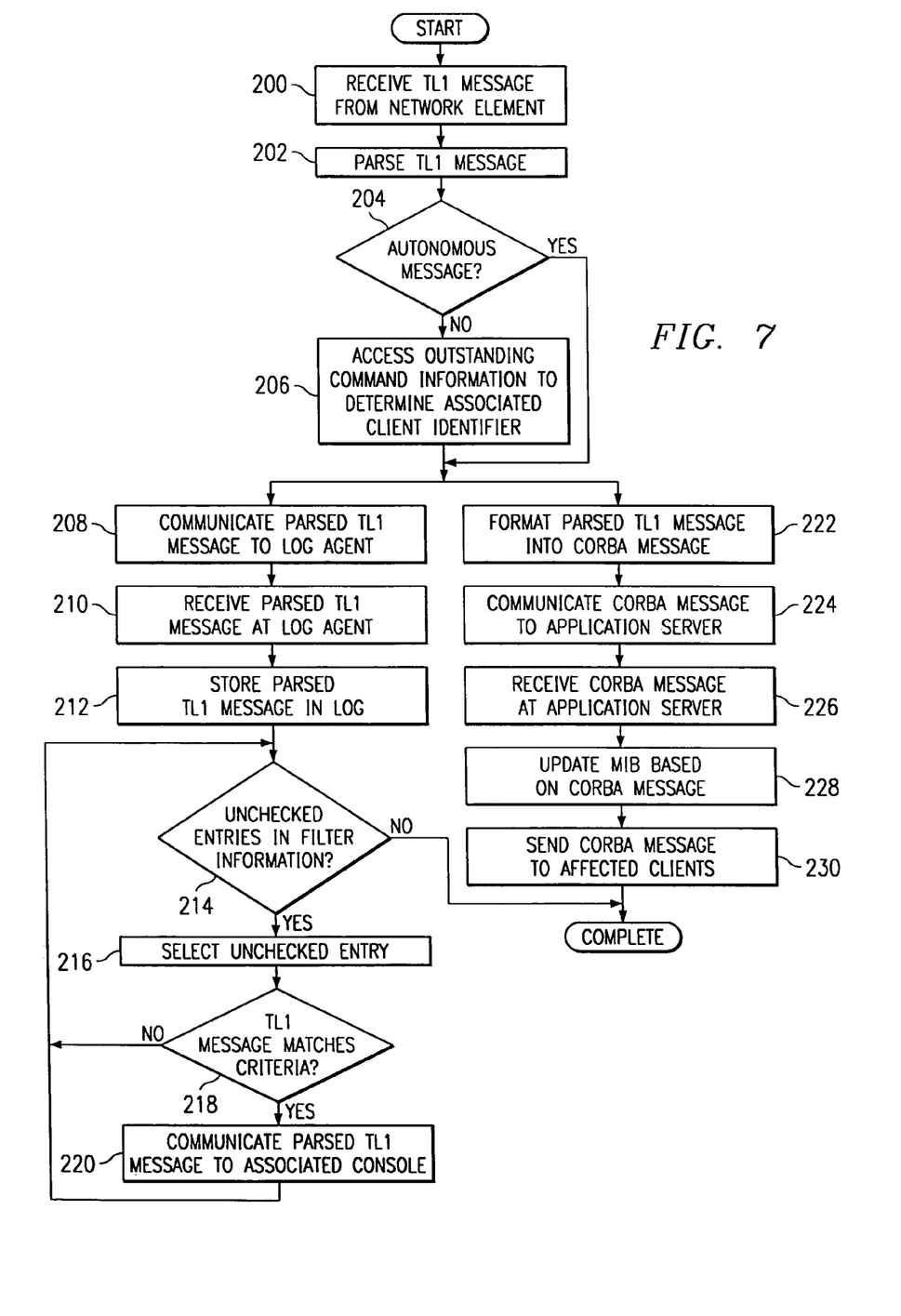
FIG. 7 is a flowchart illustrating a method for processing a received network management message including parsing and filtering the message for communication to selected consoles.

FIG. 7 illustrates a method for processing TL1 messages received from network element 16. Communication server 26 receives a TL1 message from network element 16 at step 200 and parses the TL1 message at step 202. Communication server 26 determines whether this is an autonomous message at step 204. If not, the message is in response to an earlier communicated command. Thus, communication server 26 accesses outstanding command information 34 to determine an associated client 14 at step 206. After determining the associated client 14 or upon determining that this was an autonomous message, communication server 26 initiates two processes, one to log and report the TL1 message and one to communicate the response to appropriate clients 14.

Thus, to initiate logging and reporting, communication server 26 communicates the parsed TL1 message to log agent 36 at step 208, and log agent 36 receives the parsed TL1 message from communication server 26 at step 210. Log agent 36 stores the parsed TL1 message in log 30 at step 212. In addition, for reporting of the message to appropriate clients 14, log agent 36 determines whether unchecked entries in filter information 38 remain at step 214. This determines whether all entries for consoles 22 in filter information 38 have been compared against the message. If no unchecked entries remain, processing for this message is complete. However, if unchecked entries remain, log agent 36 selects an unchecked entry from filter information 38 at step 216 and determines whether the parsed TL1 message satisfies the criteria established for that entry at step 218. If not, log agent 36 continues checking the remaining entries in filter information 38. However, upon determining that the fields of the TL1 message satisfy the criteria for an entry, log agent 36 communicates the parsed TL1 message to the associated console 22 at step 220.

In addition to the logging and reporting, communication server 26 also provides for the delivery of the received message to the appropriate client 14 or clients 14. Thus, communication server 26 formats the parsed TL1 message into a CORBA message at step 222. For example, using the fields parsed from the TL1 message along with the client identifier determined from accessing outstanding command information 34, communication server 26 may generate a CORBA message. Communication server 26 communicates the CORBA message to application server 24 at step 224.

Application server 24 receives the CORBA message from communication server 26 at step 226. Based on the information contained in the CORBA message, application server 24 updates information in MIB 32 to reflect the current state and configuration for network element 16 associated with the CORBA message. Application server 24 performs this update at step 228. Application server 24 also communicates the CORBA message to affected clients 14 at step 230. For example, application server 24 may communicate the CORBA message to the client identified in the CORBA message. Moreover, application server 24 may access MIB 32 to determine other clients 14 currently managing or monitoring the particular network element 16 or elements 16 affected by the CORBA message and communicate copies of the CORBA message to each of these clients 14. Thus, application server 24 may initiate the update of GUI's 18 for all appropriate clients 14.

While the preceding flowcharts illustrate exemplary methods of operation, system 10 contemplates elements of server 12 and clients 14 using any suitable techniques for communicating various network management messages with network elements 16 and parsing and filtering these messages for display on consoles 22. Thus, while these flowcharts illustrate specific steps taking place in particular orders, system 10 contemplates elements performing many of the steps in these flowcharts simultaneously and/or in different orders than as shown. Moreover, as previously discussed, system 10 also contemplates any suitable distribution or separation of functionalities between various elements in server 12 and clients 14. Thus, while many of the steps in these flowcharts are described as taking place in particular elements, system 10 contemplates any suitable distribution, separation or combination of functionalities in particular elements. Furthermore, system 10 contemplates server 12 and clients 14 using methods with additional steps, fewer steps, and/or different steps, so long as the methods remain appropriate for the communication of network management messages with network elements 16 and the parsing and filtering of these messages for display on selected consoles.

Although the present invention has been described in several embodiments, a myriad of changes and modifications may be suggested to one skilled in the art, and it is intended that the present invention encompasses such changes and modifications as followed in the scope of the present appended claims.

What is claimed is:

1. A method for processing a network management message comprising:
    receiving a network management message;
    parsing the network management message into a plurality of fields; and
    for each of a plurality of client consoles each having associated filtering criteria,
    determining whether particular ones of the plurality of fields of the parsed network management message satisfy the filtering criteria associated with that client console; and
    communicating the particular fields of the parsed network management message determined to satisfy the filtering criteria to that client console for display by that client console,
    wherein the filtering criteria comprising a message type and a user type, wherein the fields satisfy the filtering criteria if a value for a selected one of the fields matches the message type and the user type indicates an authorization to receive the message.

2. The method of claim 1, wherein the network management message comprises American Standard Code for Information Interchange (ASCII) text.

3. The method of claim 1, wherein the filtering criteria for each of the client consoles comprise a message type.

4. The method of claim 1, wherein the filtering criteria for each of the client consoles comprise a user type for the client console.

5. The method of claim 1, further comprising:
    receiving a request from a new client console, the request comprising an identifier for the new client console filtering options selected for the new client console;
    determining a user type for the new client console based on the identifier; and
    generating filtering criteria for the new client console based on the filtering options and the user type.

6. The method of claim 5, further comprising generating an entry in a filter table comprising the identifier and the filtering criteria.

7. The method of claim 1, wherein the network management message comprises a response from a command issued by a client, further comprising:
    determining a message identifier from the fields;
    determining a client identifier associated with the message identifier;
    identifying the client based on the client identifier;
    generating a second message comprising the fields and the client identifier; and
    communicating the second message to the client.

8. A Computer readable media storing logic for processing a network management message, the logic operable when executed to:
    receive a network management message;
    parse the network management message into a plurality of fields; and
    for each of a plurality of client consoles each having associated filtering criteria,
    determine whether particular ones of the plurality of fields of the parsed network management message satisfy the filtering criteria associated with that client console; and
    communicate the particular fields of the parsed network management message determined to satisfy the filtering criteria to that client console for display by that client console,
    wherein the filtering criteria comprising a message type and a user type, wherein the fields satisfy the filtering criteria if a value for a selected one of the fields matches the message type and the user type indicates an authorization to receive the message.

9. The computer readable media of claim 8, wherein the network management message comprises American Standard Code for Information Interchange (ASCII) text.

10. The computer readable media of claim 8, further operable when executed to:
    receive a request from a new client console, the request comprising an identifier for the new client console filtering options selected for the new client console;
    determine a user type for the new client console based on the identifier; and
    generate filtering criteria for the new client console based on the filtering options and the user type.

11. The computer readable media of claim 8, wherein the network management message comprises a response from a command issued by a client, the logic further operable when executed to:
    determine a message identifier from the fields;
    determine a client identifier associated with the message identifier;
    identify the client based on the client identifier;
    generate a second message comprising the fields and the client identifier; and
    communicate the second message to the client.

12. An apparatus for processing a network management message comprising:
    means for receiving a network management message;
    means for parsing the network management message into a plurality of fields; and
    for each of a plurality of client consoles each having associated filtering criteria, means for determining whether particular ones of the plurality of fields of the parsed network management message satisfy the filtering criteria associated with that client console; and means for communicating the particular fields of the parsed network management message determined to satisfy the filtering criteria to that client console for display by that client console, wherein the filtering criteria comprising a message type and a user type, wherein the fields satisfy the filtering criteria if a value for a selected one of the fields matches the message type and the user type indicates an authorization to receive the message.

13. The apparatus of claim 12, further comprising:

means for receiving a request from a new client console, the request comprising an identifier for the new client console filtering options selected for the new client console;

means for determining a user type for the new client console based on the identifier; and means for generating filtering criteria for the new client console based on the filtering options and the user type.

14. The apparatus of claim 12, wherein the network management message comprises a response from a command issued by a client, further comprising:

means for determining a message identifier from the fields;

means for determining a client identifier associated with the message identifier;

means for identifying the client based on the client identifier;

means for generating a second message comprising the fields and the client identifier; and means for communicating the second message to the client.

15. A communication system comprising:

a client operable to generate a common object request broker architecture (CORBA) command targeted at a network element and to communicate the CORBA command to a server;

the server operable to receive the CORBA command, to determine fields for a transaction language 1 (TL1) command based on the CORBA command, to generate the TL1 command using the fields, to communicate the TL1 command to the network element, and, for each of a plurality of client consoles each having associated filtering criteria, determining whether particular ones of the plurality of fields of a parsed network management message satisfy the filtering criteria associated with that client console and to communicate the particular fields of the parsed network management message determined to satisfy the filtering criteria to that client console for display by that client console, wherein the filtering criteria comprising a message type and a user type, wherein the fields satisfy the filtering criteria if a value for a selected one of the fields matches the message type and the user type indicates an authorization to receive the message.

\* \* \* \* \*

UNITED STATES PATENT AND TRADEMARK OFFICE
CERTIFICATE OF CORRECTION

PATENT NO. : 7,457,858 B2
APPLICATION NO. : 09/824997
DATED : November 25, 2008
INVENTOR(S) : Gilbert Levesque et al.

It is certified that error appears in the above-identified patent and that said Letters Patent is hereby corrected as shown below:

Col. 3, Ln. 32: After "example" delete "GUT" and insert --GUI--.

Signed and Sealed this

Twenty-ninth Day of September, 2009

David J. Kappos
*Director of the United States Patent and Trademark Office*